(12) United States Patent
Carr et al.

(10) Patent No.: US 11,629,752 B2
(45) Date of Patent: Apr. 18, 2023

(54) BEARING HOUSING ASSEMBLY FOR A BLENDER JAR

(71) Applicant: WHIRLPOOL CORPORATION, Benton Harbor, MI (US)

(72) Inventors: Robert T. Carr, Paw Paw, MI (US); Timothy E. Heater, Hartford, MI (US); Arren J. McCormick, Benton Harbor, MI (US); Paul S. Paget, Kalamazoo, MI (US); Jeremy T. Wolters, Stevensville, MI (US); Ping Zhang, Aurora, IL (US)

(73) Assignee: Whirlpool Corporation, Benton Harbor, MI (US)

( * ) Notice: Subject to any disclaimer, the term of this patent is extended or adjusted under 35 U.S.C. 154(b) by 399 days.

(21) Appl. No.: 16/783,441

(22) Filed: Feb. 6, 2020

(65) Prior Publication Data
US 2021/0246936 A1  Aug. 12, 2021

(51) Int. Cl.
| A47J 43/00 | (2006.01) |
| F16C 13/02 | (2006.01) |
| A47J 43/046 | (2006.01) |
| F16C 35/063 | (2006.01) |
| B01F 27/808 | (2022.01) |
| B01F 35/30 | (2022.01) |

(52) U.S. Cl.
CPC .......... *F16C 13/022* (2013.01); *A47J 43/046* (2013.01); *B01F 27/808* (2022.01); *F16C 35/063* (2013.01); *B01F 2035/351* (2022.01); *B01F 2035/352* (2022.01)

(58) Field of Classification Search
CPC ... A47J 43/046; A47J 43/0716; B01F 27/808; B01F 27/90; B01F 2035/351; B01F 2035/352; B01F 35/00; F16C 13/022; F16C 35/063
USPC ............... 366/199, 205, 314, 331; 241/282.1
See application file for complete search history.

(56) References Cited

U.S. PATENT DOCUMENTS

| 2,328,526 A | * | 8/1943 | Grove ................... A47J 43/046 241/199.12 |
| 2,585,255 A | | 2/1952 | Kochner et al. |
| 3,064,949 A | * | 11/1962 | Dewenter ............. A47J 43/046 366/144 |
| 2,897,862 A | | 8/1969 | Malz et al. |
| 3,603,364 A | | 9/1971 | Samuelian et al. |
| 3,612,126 A | | 10/1971 | Emmons et al. |
| 8,042,990 B2 | | 10/2011 | Pryor, Jr. et al. |
| 8,056,848 B1 | | 11/2011 | Liang |

(Continued)

FOREIGN PATENT DOCUMENTS

DE        1039203 B        9/1958

*Primary Examiner* — Anshu Bhatia
(74) *Attorney, Agent, or Firm* — Price Heneveld LLP

(57) ABSTRACT

A blender assembly includes a blender jar having a bottom wall. The bottom wall includes first and second surfaces opposing one another and an interior edge defining an opening. A bearing housing is positioned at least partially within the opening and is spaced apart from the first surface of the bottom wall and the interior edge of the bottom wall. A nut is operably coupled with the bearing housing and is spaced apart from a second surface of the bottom wall. A gasket assembly is positioned to maintain a spacing of the bearing housing and the nut relative to the bottom wall. The gasket assembly is positioned over the interior edge of the bottom wall.

19 Claims, 6 Drawing Sheets

(56) References Cited

U.S. PATENT DOCUMENTS

| | | |
|---|---|---|
| 8,721,165 B2 | 5/2014 | Conti |
| 9,283,528 B2 | 3/2016 | Thai |
| 9,750,372 B2 | 9/2017 | Foxlee et al. |
| 10,493,412 B2 | 12/2019 | Dickson, Jr. et al. |
| 2016/0331181 A1* | 11/2016 | Dickson, Jr. ........ B01F 27/1123 |
| 2018/0008097 A1 | 1/2018 | Mehlman |

* cited by examiner

BEARING HOUSING ASSEMBLY FOR A BLENDER JAR

FIELD OF DISCLOSURE

The present disclosure generally relates to a bearing housing assembly, and more specifically, to bearing housing assembly for a blender jar.

BACKGROUND

Blender assemblies include removable blender jars and blender bases. In operation, the blender base rotates blades within the blender jar. When the blender assembly is in operation, the vibration between the removable blender jar and the blender base may produce noise.

SUMMARY OF THE DISCLOSURE

According to one aspect of the present disclosure, a blender assembly includes a blender jar having a bottom wall. The bottom wall includes first and second surfaces opposing one another and an interior edge defining an opening. A bearing housing is positioned at least partially within the opening and is spaced apart from the first surface of the bottom wall and the interior edge of the bottom wall. A nut is operably coupled with the bearing housing and is spaced apart from a second surface of the bottom wall. A gasket assembly is positioned to maintain a spacing of the bearing housing and the nut relative to the bottom wall. The gasket assembly is positioned over the interior edge of the bottom wall.

According to another aspect of the present disclosure, a blender assembly includes a blender jar having a bottom wall. The bottom wall includes an interior edge defining an opening. A bearing housing is positioned within the blender jar and extends at least partially through the opening. The bearing housing is spaced apart from the bottom wall and the interior edge of the bottom wall by a first spacing. A nut is positioned exterior of the blender jar and operably coupled with the bearing. The nut is spaced apart from the bottom wall by a second spacing. A first gasket is positioned to maintain the first spacing of the bearing housing relative to the bottom wall. A second gasket is positioned to maintain the second spacing of the nut relative to the bottom wall.

According to yet another aspect of the present disclosure, a bearing housing assembly for a blender assembly includes a blender jar having a bottom wall. The bottom wall includes an interior edge defining an opening. A bearing housing extends at least partially through the opening and is spaced apart from the bottom wall and the interior edge of the bottom wall. A nut is operably coupled with the bearing housing and is spaced apart from the bottom wall. A first gasket is positioned to maintain a first spacing of the bearing housing relative to the bottom wall. A second gasket is positioned to maintain a second spacing of the nut relative to the bottom wall. A retention feature is configured to retain at least one of the first gasket and the second gasket.

These and other features, advantages, and objects of the present disclosure will be further understood and appreciated by those skilled in the art by reference to the following specification, claims, and appended drawings.

Figure 1:
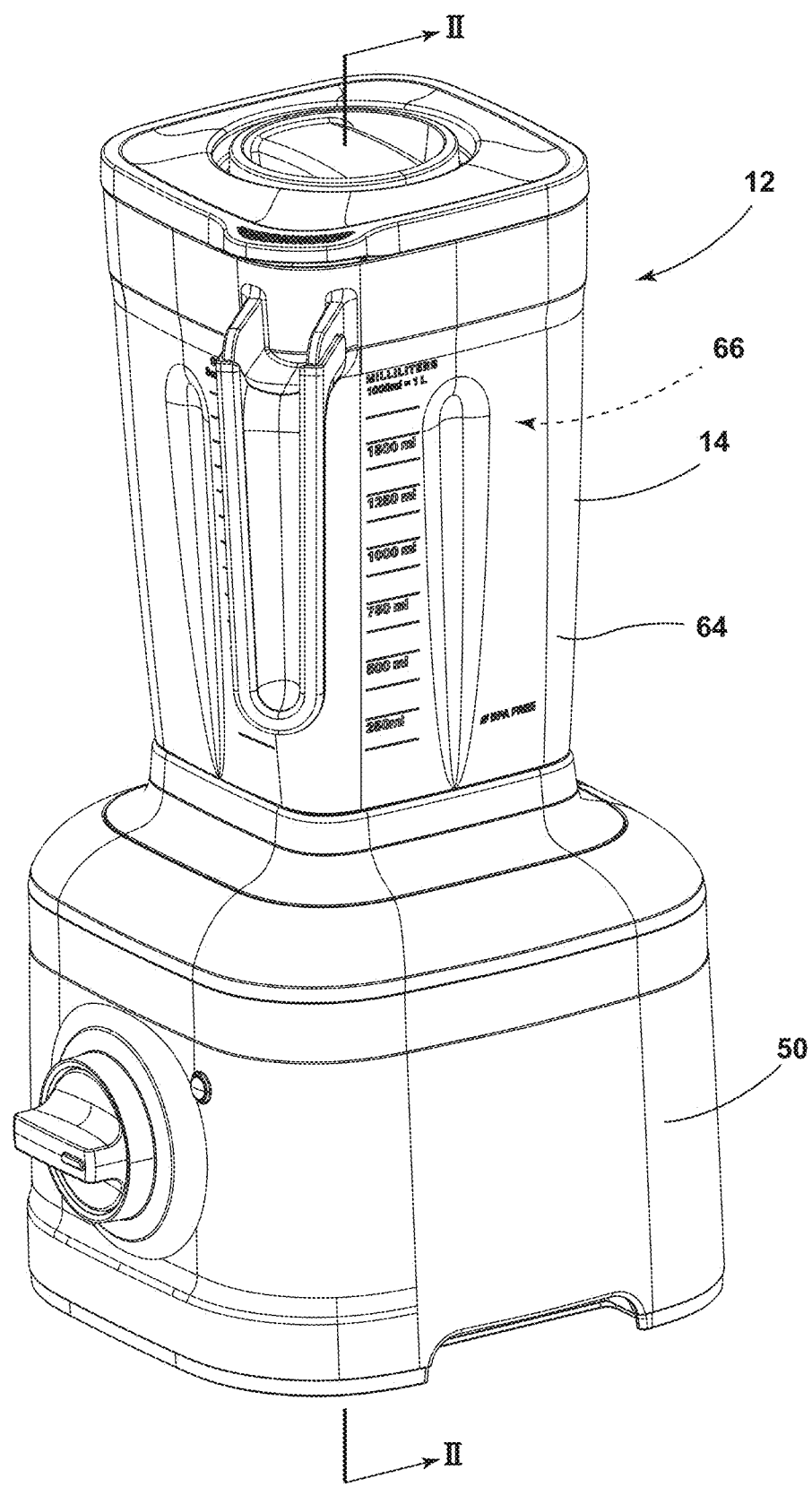
FIG. 1 is a side perspective view of a blender assembly including a blender jar and a motor housing.

The components in the figures are not necessarily to scale, emphasis instead being placed upon illustrating the principles described herein.

DETAILED DESCRIPTION

The present illustrated embodiments reside primarily in combinations of method steps and apparatus components related to a bearing housing assembly for a blender jar. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-4, reference numeral 10 generally designates a bearing housing assembly of a blender assembly 12. A blender jar 14 includes a bottom wall 16 that has an interior edge 18. The interior edge 18 defines an opening 20. A bearing housing 22 is positioned at least partially within the opening 20 and is spaced apart from a first surface 24 of the bottom wall 16 and from the interior edge 18 of the bottom wall 16. A nut 26 is operably coupled with the bearing housing 22. The nut 26 is spaced apart from a second, opposing surface 28 of the bottom wall 16 of the blender jar 14. A gasket assembly 30 is positioned to maintain the spacing of the bearing housing 22 and the nut 26 relative to the bottom wall 16 of the blender jar 14. The gasket assembly 30 is positioned over the interior edge 18 of the bottom wall 16.

Figure 2:
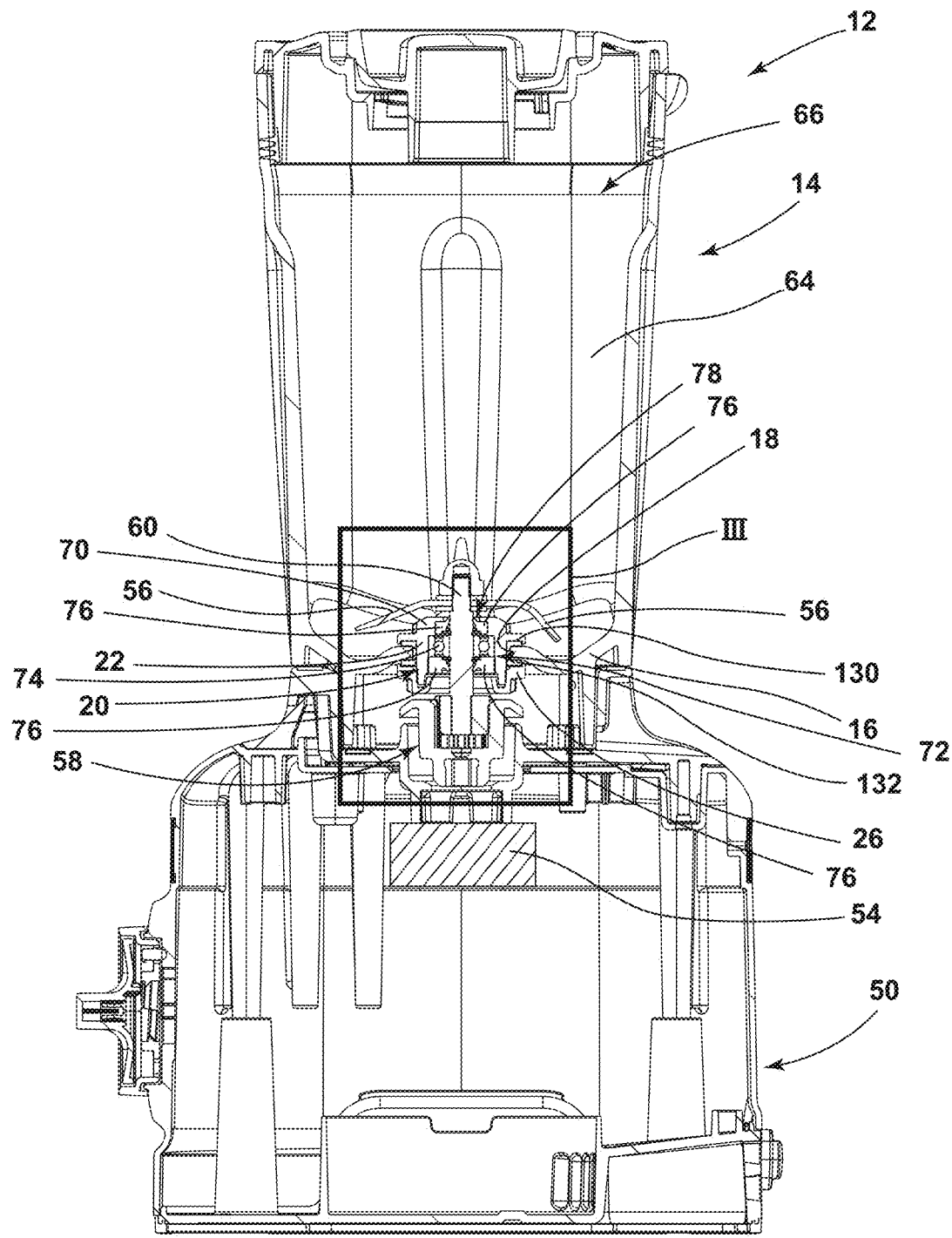
FIG. 2 is a cross-sectional view of the blender assembly of FIG. 1 taken along line II-II.

Referring now to FIGS. 1 and 2, the blender assembly 12 includes a blender base 50 configured to be removably and operably coupled with the blender jar 14. The blender base 50 is configured to house a motor 54 schematically illustrated in FIG. 2. The motor 54 is configured to be operably coupled with a plurality of blades 56 positioned within the blender jar 14. A coupler assembly 58 couples the motor 54 with the plurality of blades 56 by engaging with a shaft 60. The shaft 60 extends from the plurality of blades 56 and through the bearing housing assembly 10. When the blender jar 14 is coupled with the blender base 50, the shaft 60 is engaged with the coupler assembly 58 and is selectively rotatable by the motor 54.

Referring still to FIGS. 1 and 2, the blender jar 14 includes the bottom wall 16 extending radially inward from an outer wall 64 of the blender jar 14 toward the opening 20. The outer wall 64 at least partially defines a cavity 66 of the blender jar 14 configured to receive goods for blending. The bottom wall 16 includes the first surface 24 (FIG. 3) positioned within the cavity 66 (e.g., an interior surface) and the second surface 28 (FIG. 3) positioned exterior of the cavity 66 (e.g., an exterior surface). The bottom wall 16 of the blender jar 14 includes the interior edge 18. The interior edge 18 defines the opening 20 of the bottom wall 16 of the blender jar 14 and is configured to encompass the opening 20. In various examples, as illustrated, the bottom wall 16 may be non-linear. However, it is contemplated that the bottom wall 16 may be linear without departing from the scope of the present disclosure.

Figure 3:
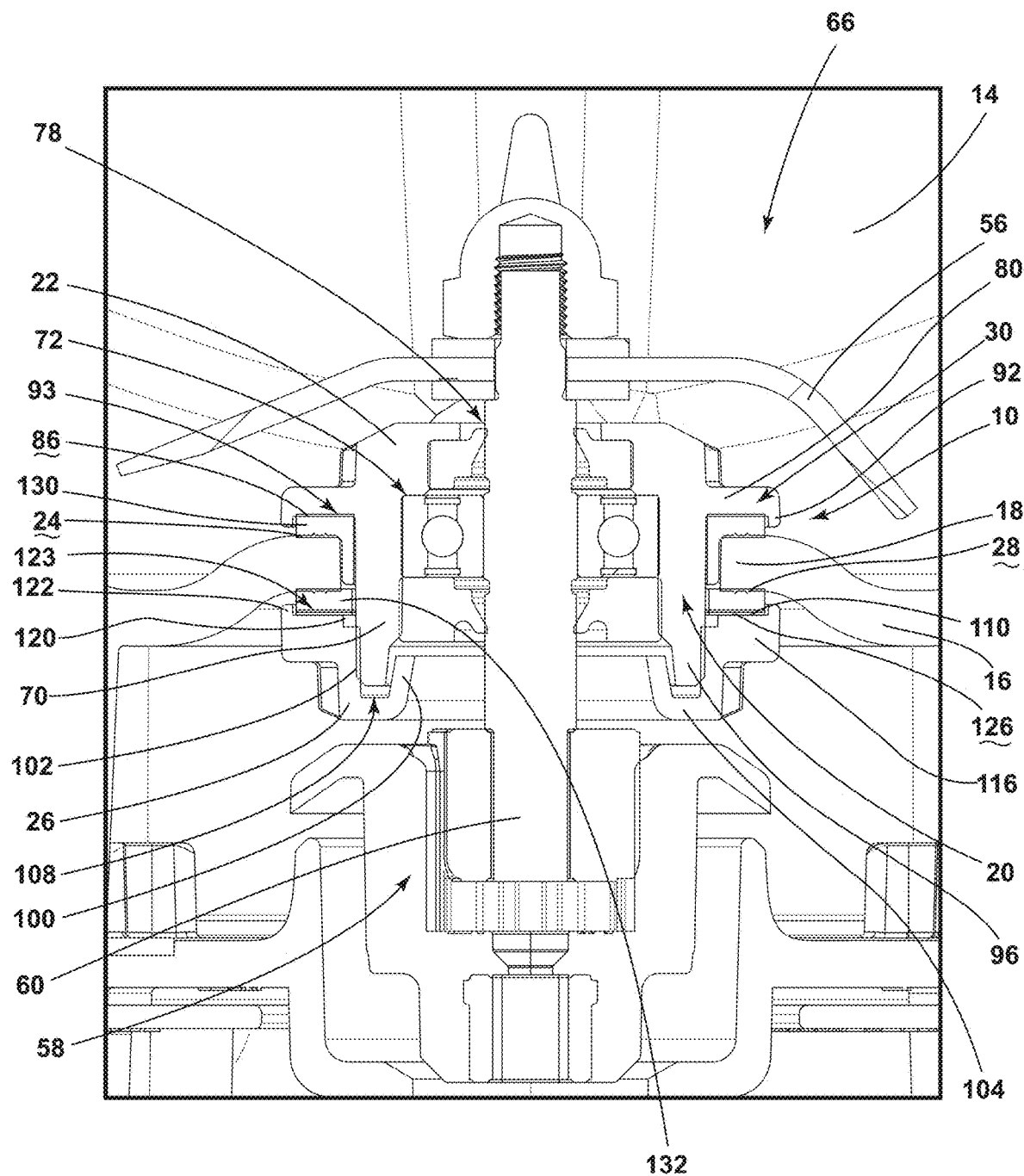
FIG. 3 is an enlarged view of section III of FIG. 2 showing a bearing housing assembly.

Referring now to FIGS. 2 and 3, the bearing housing assembly 10 is illustrated within the blender jar 14 and coupled with the blender base 50 of the blender assembly 12. The bearing housing 22 includes a body portion 70 defining a receiving space 72. The body portion 70 and the receiving space 72 may be generally cylindrical. The receiving space 72 is configured to house one or more bearings 74. For example, the receiving space 72 may be sized to house a single bearing, two bearings, or more than two bearings. As illustrated, the bearings 74 may be configured as ball bearings to facilitate rotation of the plurality of blades 56 by the shaft 60.

A plurality of seal members 76 may be positioned within the receiving space 72 and may be configured to seal the shaft 60 to prevent contents of the blender jar 14 from entering the receiving space 72. The bearing housing assembly 10 may include any number of seal members 76 without departing from the scope of the present disclosure. Further, the seal members 76 may be formed of any material configured to provide a seal around the shaft 60.

The body portion 70 of the bearing housing 22 further defines an upper aperture 78 configured to receive the shaft 60 and sealed by one or more of the plurality of seal members 76. The upper aperture 78 defines an upper rim of the bearing housing 22 opening into the receiving space 72. The body portion 70 of the bearing housing 22 is positioned within the blender jar 14 and extends through the opening 20 of the bottom wall 16 of the blender jar 14. The body portion 70 of the bearing housing 22 is spaced apart from the interior edge 18 of the bottom wall 16 by a first spacing, as discussed in more detail elsewhere herein.

Figure 4A:
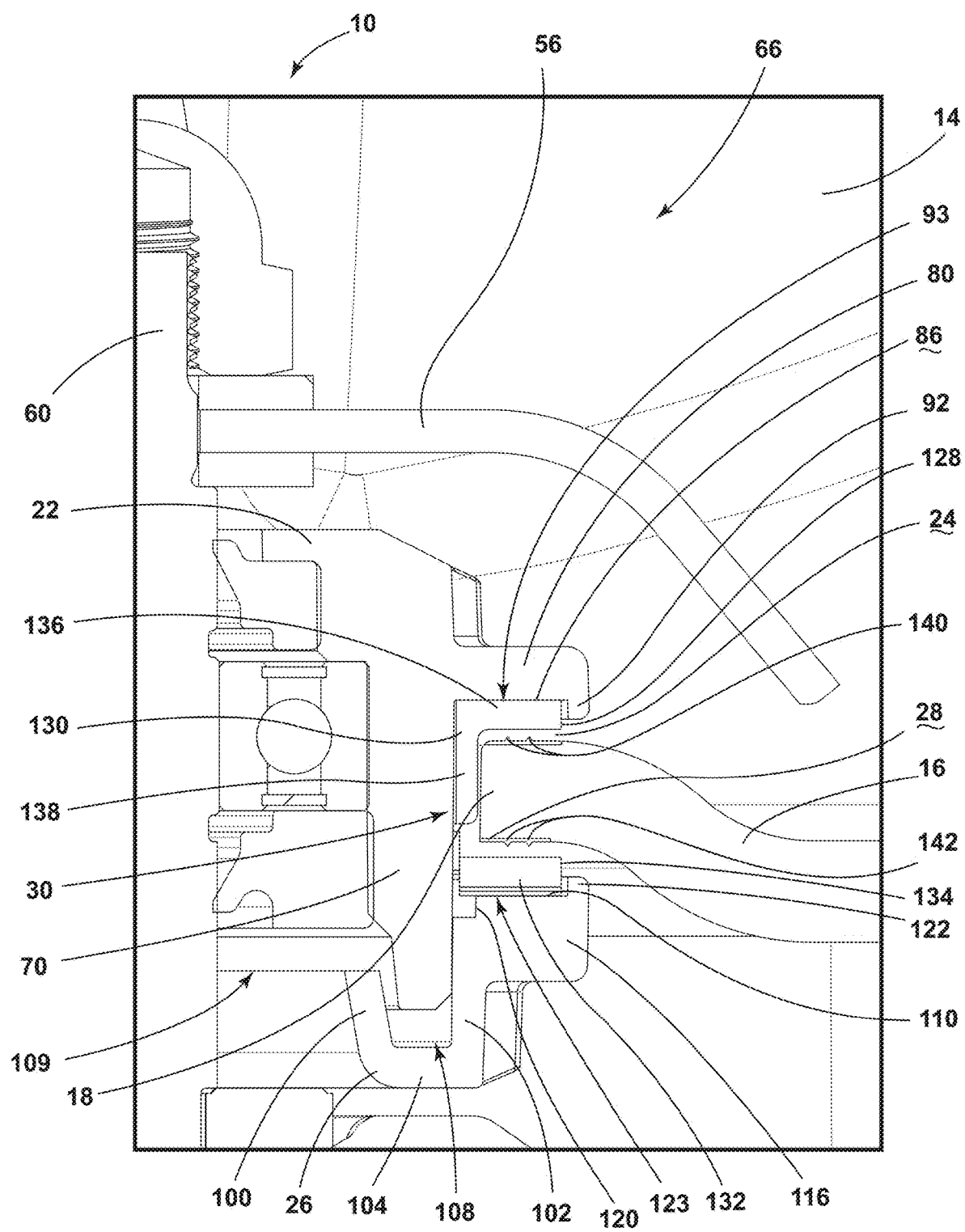
FIG. 4A is an enlarged view of one half of the bearing housing assembly of FIG. 3 before a gasket assembly is compressed.
Figure 4B:
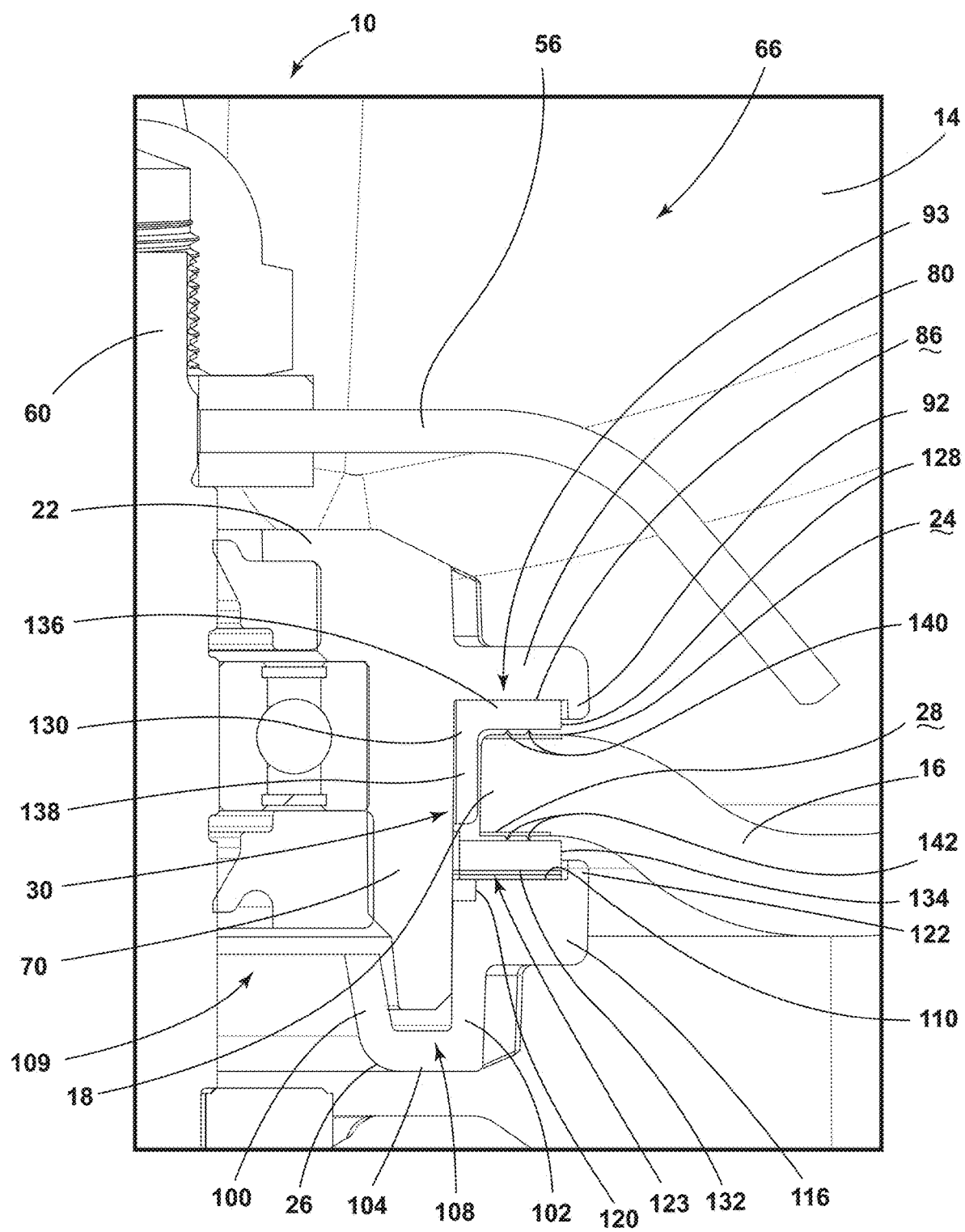
FIG. 4B is an enlarged view of the half of the bearing housing assembly of FIG. 4A after the gasket assembly is compressed.
Figure 5:
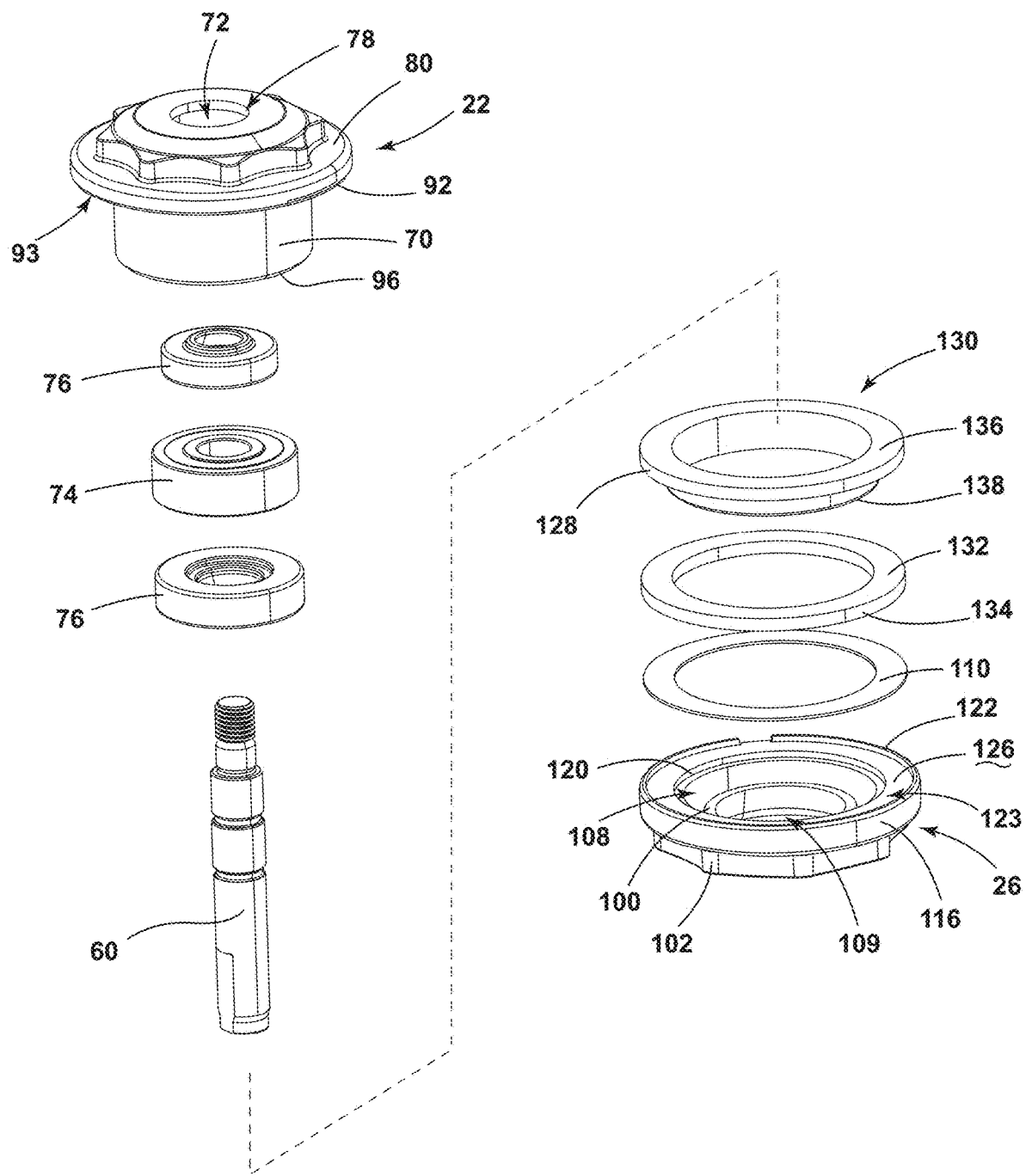
FIG. 5 is an exploded view of the bearing housing assembly of FIG. 3.

Referring now to FIGS. 3 and 4, a protrusion 80 extends circumferentially from the body portion 70 of the bearing housing 22. The protrusion 80 is sized to prevent the protrusion 80 from passing through the opening 20 of the bottom wall 16 of the blender jar 14, such that the bearing housing 22 extends partially through the opening 20 of the bottom wall 16. The protrusion 80 is at least partially aligned with and spaced apart from the bottom wall 16. A lower surface 86 of the protrusion 80 is positioned parallel with, and spaced apart from, the first surface 24 of the bottom wall 16 of the blender jar 14.

Referring still to FIGS. 3 and 4, in various examples, the protrusion 80 may further include a downwardly extending shoulder 92. The downwardly extending shoulder 92 extends from an end of the protrusion 80 opposite the body portion 70 of the bearing housing 22. The downwardly extending shoulder 92 is positioned perpendicular to the protrusion 80 and extends downwardly toward the bottom wall 16 toward the first surface 24 of the bottom wall 16 of the blender jar 14 to define a downwardly opening channel 93 disposed circumferentially around the body portion 70 of the bearing housing 22. As illustrated, the downwardly extending shoulder 92 may abut the first surface 24 of the bottom wall 16 of the blender jar 14. However, it is contemplated that the downwardly extending shoulder 92 may be spaced apart from the first surface 24 of the bottom wall 16 without departing from the scope of the present disclosure.

The body portion 70 of the bearing housing 22 further includes a lower rim 96. The lower rim 96 defines a lower aperture of the bearing housing 22 opening into the receiving space 72. The lower rim 96 is positioned exterior of the cavity 66 of the blender jar 14, in assembly, and is characterized by a change in diameter of the receiving space 72 of the body portion 70 of the bearing housing 22. For example, as illustrated in FIGS. 3 and 4, the lower rim 96 may be tapered away from the protrusion 80 within the receiving space 72, such that the receiving space 72 increases in diameter toward the lower rim 96.

With continued reference to FIGS. 3 and 4, the bearing housing 22 is operably coupled with the nut 26, as introduced above. The nut 26 is generally circular and includes an inner wall 100 and an outer wall 102. A base portion 104 of the nut 26 extends between the inner wall 100 and the outer wall 102. As illustrated, the inner wall 100 may extend from an edge of the base portion 104 and may be generally arcuate. The outer wall 102 may extend from an opposing edge of the base portion 104 and may be generally linear. It is contemplated that the outer wall 102 may be arcuate while the inner wall 100 is linear, that both the inner wall 100 and the outer wall 102 may be linear, or that both the inner wall 100 and the outer wall 102 may be arcuate.

A channel 108 is defined between the inner wall 100 and the outer wall 102. The channel 108 opens upwardly and is configured to receive the lower rim 96 of the bearing housing 22 in assembly. When the lower rim 96 of the bearing housing 22 is received by the channel 108, the inner wall 100 of the nut 26 is at least partially received in the receiving space 72 of the bearing housing 22. The shaft 60 is configured to extend through a lower aperture 109 of the nut 26 defined by the inner wall 100 when the nut 26 is coupled with the bearing housing 22.

As illustrated in FIGS. 3 and 4, the outer wall 102 of the nut 26 includes a rim portion 116. The rim portion 116 is configured to align with the bottom wall 16 of the blender jar 14. The rim portion 116 extends circumferentially from the outer wall 102 and includes an inner step 120 and an upwardly extending shoulder 122. The inner step 120 is positioned inward of the upwardly extending shoulder 122 and exterior of the outer wall 102. Thus, the upwardly extending shoulder 122 of the rim portion 116 extends upwardly from an outer edge of the rim portion 116 to define an upwardly opening channel 123 disposed circumferentially around the nut 26.

The rim portion 116 includes an upper rim surface 126 that extends from the outer wall 102 of the nut 26 radially outward to the inner step 120. The rim surface 126 is spaced apart from the second surface 28 of the bottom wall 16 of the blender jar 14 by a second spacing and may be spaced apart from the body portion 70 of the bearing housing 22 when the bearing housing 22 is coupled with the nut 26. The upwardly extending shoulder 122 extends from the rim portion 116 parallel to the outer wall 102 of the nut 26 and perpendicular to the rim surface 126.

Referring still to FIGS. 3 and 4, the bearing housing assembly 10 includes the gasket assembly 30 configured to maintain the spacing of the bearing housing 22 and the nut 26 relative to the bottom wall 16 of the blender jar 14. The gasket assembly 30 is configured to wrap around the interior edge 18 of the bottom wall 16 of the blender jar 14 to maintain the first spacing between the bearing housing 22 relative to the interior edge 18 and the second spacing between the nut 26 and the blender jar 14. The gasket assembly 30 is configured to provide a compressible material between the bearing housing 22 and the interior edge 18 to act as a damper. As illustrated, the gasket assembly 30 includes first and second gaskets 130, 132 positioned on opposing sides of the bottom wall 16. However, it is contemplated that the gasket assembly 30 may include a single gasket configured to wrap around the interior edge 18.

As illustrated, the first gasket 130 is positioned between the bearing housing 22 and the blender jar 14. The first gasket 130 may be a ring gasket that includes a generally L-shaped cross-section. The first gasket 130 includes a first leg 136 and a second leg 138. When the first gasket 130 is positioned between the bearing housing 22 and the blender jar 14, the first leg 136 is received in the downwardly opening channel 93 of the protrusion 80 of the bearing housing 22, such that the first leg is positioned between the lower surface 86 of the protrusion 80 and the first surface 24 of the bottom wall 16 of the blender jar 14. The second leg 138 extends downwardly from an inner portion of the first leg 136 and is positioned between the interior edge 18 of the bottom wall 16 of the blender jar 14 and the body portion 70 of the bearing housing 22 in assembly. However, it is contemplated that the first gasket 130 may be any shape configured to surround the interior edge 18 of the bottom wall 16 of the blender jar 14 to maintain the spacing of the bearing housing 22 relative to the blender jar 14.

The second gasket 132 of the gasket assembly 30 is positioned between the nut 26 and the bottom wall 16 of the blender jar 14. As illustrated, the second gasket 132 may be a flat ring gasket, and may be positioned substantially flush with the rim surface 126 of the nut 26. Thus, the second gasket 132 is configured to be received in the upwardly opening channel 123 disposed around the nut 26. The second gasket 132 is configured to maintain the spacing of the nut 26 relative to the bottom wall 16 of the blender jar 14. It is contemplated that the second gasket 132 may be any shape configured to maintain the spacing of the nut 26 relative to the blender jar 14, including, for example, a shape having an L-shaped cross-section. For example, the second gasket 132 may have an L-shaped cross-section while the first gasket 130 is formed as a flat gasket or the second gasket 132 and the first gasket 130 may each have L-shaped cross-sections configured to abut between the body portion 70 of the bearing housing 22 and the interior edge 18 of the bottom wall 16.

Referring now to FIG. 3, in various examples, the first gasket 130 may be retained by a retention feature. For example, the retention feature retaining the first gasket 130 may be the downwardly extending shoulder 92 of the protrusion 80 of the bearing housing 22. The downwardly extending shoulder 92 of the protrusion 80 of the bearing housing 22 may wrap around and/or extend along an outer edge 128 of the first gasket 130. In other examples, the retention feature of the first gasket 130 may be a first plurality of retention ribs 140 extending from the first surface 24 of the bottom wall 16 of the blender jar 14. The first plurality of retention ribs 140 may be integrally formed with the first surface 24 or may be operably coupled with the first surface 24. The plurality of retention ribs 140 are configured to grip the first leg 138 of the first gasket 130. Each of the plurality of retention ribs 140 extends circumferentially about the opening 20 of the bottom wall 18 and includes a toothed end configured to bite into and retain the first gasket 130. It is contemplated that one or both of the first plurality of retention ribs 140 and the downwardly extending shoulder 92 may be used to retain the first gasket 130 to maintain the spacing of the bearing housing 22.

The second gasket 132 may be retained by a retention feature. For example, the second gasket 132 may be retained by the upwardly extending shoulder 122 of the rim portion 116 of the nut 26. The upwardly extending shoulder 122 may wrap around and/or extend along an outer edge 134 of the second gasket 132. In other examples, the second gasket 132 may be retained by a second plurality of retention ribs 142 extending from the second surface 28 of the bottom wall 16 of the blender jar 14. The second plurality of ribs 142 may be integrally formed with the second surface 28 or may be operably coupled with the second surface 28. The second plurality of retention ribs 142 are configured to grip the second gasket 132 to prevent the second gasket 132 from sliding out of position. Each of the plurality of retention ribs 142 extends circumferentially about the opening 20 of the bottom wall 18 and includes a toothed end configured to bite into and retain the second gasket 132. It is contemplated that one or both of the second plurality of retention ribs 142 and the upwardly extending shoulder 122 may be used to retain the second gasket 132 to maintain the spacing of the bearing housing 22 and the nut 26.

The bearing housing 22 may be fixedly coupled with the nut 26 by spin welding. A washer 110 may be positioned over the rim surface 126 of the nut 26 to separate the nut 26 from the second gasket 132. The washer 110 extends from the inner step 120 to the body portion 70 of the bearing housing 22. The washer 110 separates the nut 26 and the second gasket 132 during the spin welding process to prevent the second gasket 132 from being damaged or moved during assembly of the bearing housing assembly 10. Alternatively, the bearing housing 22 may be coupled with the nut 26 by threads, adhesive, or any other coupling method configured to fixedly couple the bearing housing 22 with the nut 26.

The bearing housing assembly 10, including the gasket assembly 30, is configured to reduce vibration noise caused by contact between the bearing housing assembly 10 and the blender jar 14 when the blender jar 14 is coupled with the blender base 50. The first and second gaskets 130, 132 are configured to be compressed between the bottom wall 16 of the blender jar 14 and the bearing housing assembly 10 to prevent vibration noise when a user is operating the blender assembly 12. The gasket assembly 30 may further act to at least partially seal the blender jar 14 around the bearing housing 22 to prevent leaks through the opening 20 of the bottom wall 16.

According to one aspect, a blender assembly includes a blender jar that has a bottom wall. The bottom wall includes first and second surfaces opposing one another and an interior edge that defines an opening. A bearing housing is positioned at least partially within the opening and is spaced apart from the first surface of the bottom wall and the interior edge of the bottom wall. A nut is operably coupled with the bearing housing and is spaced apart from a second surface of the bottom wall. A gasket assembly is positioned to maintain a spacing of the bearing housing and the nut relative to the bottom wall. The gasket assembly is positioned over the interior edge of the bottom wall.

According to another aspect, a gasket assembly includes a first gasket and a second gasket. The first gasket is positioned between a bearing housing and a first surface of a bottom wall. The first gasket is further positioned between the bearing housing and an interior edge of the bottom wall. The second gasket is positioned between a nut and a second, opposing surface of the bottom wall.

According to another aspect, a first gasket is integrally formed with a second gasket.

According to another aspect, one of a bearing housing and a nut includes a shoulder configured to retain a gasket assembly.

According to another aspect, one of first and second surfaces of a bottom wall includes a retention rib configured to retain a gasket assembly.

According to another aspect, a blender assembly includes a blender jar that has a bottom wall. The bottom wall includes an interior edge that defines an opening. A bearing housing is positioned within the blender jar and extends at least partially through the opening. The bearing housing is spaced apart from the bottom wall and the interior edge of the bottom wall by a first spacing. A nut is positioned exterior of the blender jar and is operably coupled with the bearing housing. The nut is spaced apart from the bottom wall by a second spacing. A first gasket is positioned to maintain the first spacing of the bearing housing relative to the bottom wall. A second gasket is positioned to maintain the second spacing of the nut relative to the bottom wall.

According to another aspect, first and second gaskets are integrally formed as a single gasket positioned to surround an interior edge of a bottom wall.

According to another aspect, a bearing housing includes a downwardly opening channel extending around a body portion of the bearing housing.

According to another aspect, a first gasket is received within the downwardly opening channel of the bearing housing.

According to another aspect, a nut includes an upwardly opening channel.

According to another aspect, a second gasket is received in the upwardly opening channel of the nut.

According to another aspect, one of first and second surfaces of a bottom wall includes a plurality of retention ribs configured to retain one of first and second gaskets.

According to another aspect, a blender assembly includes a blender jar that has a bottom wall. The bottom wall includes an interior edge that defines an opening. A bearing housing extends at least partially through the opening and is spaced apart from the bottom wall and the interior edge of the bottom wall. A nut is operably coupled with the bearing housing and is spaced apart from the bottom wall. A first gasket is positioned to maintain a first spacing of the bearing housing relative to the bottom wall. A second gasket is positioned to maintain a second spacing of the nut relative to the bottom wall. A retention feature is configured to retain at least one of the first gasket and the second gasket.

According to another aspect, a retention feature is a shoulder extending inwardly from one of a bearing housing and a nut toward a bottom wall.

According to another aspect, a retention feature is a retention rib extending circumferentially about one of first and second surfaces of a bottom wall.

According to another aspect, a retention rib includes a toothed end configured to retain one of first and second gaskets.

According to another aspect, first and second gaskets are integrally formed as a single gasket.

According to another aspect, a bearing housing assembly includes a washer positioned between a bearing housing and a nut.

According to another aspect, a nut is fixedly coupled with a bearing housing.

According to another aspect, one of first and second gaskets includes an L-shaped cross-section.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A blender assembly, comprising:
   a blender jar having a bottom wall, wherein the bottom wall includes first and second surfaces opposing one another, and an interior edge defining an opening;
   a bearing housing positioned at least partially within the opening and spaced apart from the first surface of the bottom wall and the interior edge of the bottom wall by a first spacing;
   a nut operably coupled with the bearing housing and spaced apart from the second surface of the bottom wall by a second spacing; and
   a gasket assembly positioned within the first spacing and the second spacing to maintain the first spacing between the bearing housing and the bottom wall and the second spacing between the nut and the bottom wall, wherein the gasket assembly is positioned over the interior edge of the bottom wall.

2. The blender assembly of claim 1, wherein the gasket assembly includes a first gasket and a second gasket, and wherein the first gasket is positioned between the bearing housing and the first surface of the bottom wall and further positioned between the bearing housing and the interior edge of the bottom wall, and further wherein the second gasket is positioned between the nut and the second surface of the bottom wall.

3. The blender assembly of claim 2, wherein the first gasket is integrally formed with the second gasket.

4. The blender assembly of claim 1, wherein one of the bearing housing and the nut includes a shoulder configured to retain the gasket assembly.

5. The blender assembly of claim 1, wherein one of the first and second surfaces of the bottom wall includes a retention rib configured to retain the gasket assembly.

6. A blender assembly, comprising:
   a blender jar having a bottom wall, wherein the bottom wall includes an interior edge defining an opening;
   a bearing housing positioned within the blender jar and extending at least partially through the opening, wherein the bearing housing is spaced apart from the bottom wall and the interior edge of the bottom wall by a first spacing;
   a nut positioned exterior of the blender jar and operably coupled with the bearing housing, wherein the nut is spaced apart from the bottom wall by a second spacing;
   a first gasket positioned to maintain the first spacing of the bearing housing relative to the bottom wall; and
   a second gasket positioned to maintain the second spacing of the nut relative to the bottom wall.

7. The blender assembly of claim 6, wherein the first and second gaskets are integrally formed as a single gasket positioned to surround the interior edge of the bottom wall.

8. The blender assembly of claim 6, wherein the bearing housing includes a downwardly opening channel extending around a body portion of the bearing housing.

9. The blender assembly of claim 8, wherein the first gasket is received within the downwardly opening channel of the bearing housing.

10. The blender assembly of claim 6, wherein the nut includes an upwardly opening channel.

11. The blender assembly of claim 10, wherein the second gasket is received in the upwardly opening channel of the nut.

12. The blender assembly of claim 6, wherein the bottom wall includes opposed first and second surfaces, and further wherein one of the opposed first and second surfaces of the bottom wall includes a plurality of retention ribs configured to retain one of the first and second gaskets.

13. A blender assembly, comprising:
   a blender jar having a bottom wall, wherein the bottom wall includes first and second surfaces and an interior edge defining an opening;
   a bearing housing extending at least partially through the opening and spaced apart from the bottom wall and the interior edge of the bottom wall;
   a nut operably coupled with the bearing housing and spaced apart from the bottom wall;
   a first gasket positioned to maintain a first spacing between the bearing housing relative to the bottom wall;
   a second gasket vertically spaced-apart from the first gasket and positioned to maintain a second spacing between the nut relative to the bottom wall; and
   a retention feature configured to retain at least one of the first gasket and the second gasket.

14. The blender assembly of claim 13, wherein the retention feature is a shoulder extending inwardly from one of the bearing housing and the nut toward the bottom wall.

15. The blender assembly of claim 13, wherein the retention feature is a retention rib extending circumferentially about one of the first surface and the second surface.

16. The blender assembly of claim 15, wherein the retention rib includes a toothed end configured to retain one of the first and second gaskets.

17. The blender assembly of claim 13, further comprising:
   a washer positioned between the bearing housing and the nut.

18. The blender assembly of claim 13, wherein the nut is fixedly coupled with the bearing housing.

19. The blender assembly of claim 13, wherein one of the first and second gaskets includes an L-shaped cross-section.

* * * * *